(12) United States Patent
Ketzer et al.

(10) Patent No.: US 6,583,373 B2
(45) Date of Patent: Jun. 24, 2003

(54) STEERING COLUMN MODULE

(75) Inventors: Thomas Ketzer, Ludenscheid (DE); Volker Heite, Olpe (DE); Benno Wessendorf, Ludenscheid (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 10/189,896

(22) Filed: Jul. 3, 2002

(65) Prior Publication Data

US 2002/0195810 A1 Dec. 26, 2002

Related U.S. Application Data

(63) Continuation of application No. PCT/EP01/01242, filed on Feb. 6, 2001.

(30) Foreign Application Priority Data

Feb. 8, 2000 (DE) .......................................... 100 05 492

(51) Int. Cl.$^7$ ................................................ H01H 9/00
(52) U.S. Cl. .................................. 200/61.54; 200/61.27
(58) Field of Search ........................... 200/61.54, 61.27, 200/61.28, 4, 17 R, 18, 332, 335; 439/15, 24, 164

(56) References Cited

U.S. PATENT DOCUMENTS

| 4,607,898 A | * | 8/1986 | Reighard et al. ............ 339/3 S |
| 5,120,914 A | * | 6/1992 | Kerner et al. ............ 200/61.54 |
| 5,431,573 A | | 7/1995 | Endo et al. |
| 5,747,763 A | | 5/1998 | Uchiyama et al. |
| 5,892,295 A | * | 4/1999 | Ohtsuka et al. ............ 307/10.1 |
| 5,944,534 A | | 8/1999 | Hoffmann et al. |
| 6,236,004 B1 | * | 5/2001 | Stadler et al. ............ 200/61.28 |
| 6,462,290 B1 | * | 10/2002 | Matsumoto ............ 200/61.54 |

* cited by examiner

*Primary Examiner*—Lincoln Donovan
*Assistant Examiner*—K. Lee
(74) *Attorney, Agent, or Firm*—Brooks & Kushman P.C.

(57) ABSTRACT

A steering column module includes functional modules arranged adjacent to one another in respective parallel planes along an axial direction relative to the longitudinal axis of a steering column. Each of the functional modules is associated with a respective plug-and-socket connector. The connectors extend radially from the longitudinal axis of the steering column. The connectors each have first and second parts. The first part of each connector being connected to the respective one of the functional modules. The second part of each connector extending radially out from the respective one of the functional modules. An electronic module extends transversely to the respective parallel planes of the functional modules and are arranged against the functional modules such that the electronic module engages the second part of each of the connectors to connect the functional modules to the electronic module and a vehicle electrical system connected to the electronic module.

8 Claims, 3 Drawing Sheets

STEERING COLUMN MODULE

CROSS-REFERENCE TO RELATED APPLICATIONS

This is a continuation of International Application PCT/EP01/01242, published in German, with an international filing date of Feb. 6, 2001.

BACKGROUND OF THE INVENTION

1. Field of the Invention

The invention concerns a steering column module. In particular, the invention concerns a motor vehicle steering column module containing at least two functional modules arranged adjacent to one another in the axial direction of the steering column, and an electronic module which is intended to make contact with the functional modules arranged in the different planes by means of plug-and-socket connectors and also to connect them to the vehicle electrical system, with the one part of each plug-and-socket connector being assigned to one functional module and the one cooperating with it being assigned to the electronic module.

2. Background Art

As a rule, motor vehicle steering column modules consist of several individual functional modules, such as, for example, steering column switches, a contact coil cassette, a steering angle sensor device, etc. These functional modules are arranged in different planes above one another in the axial direction of the steering column, and surround it. The steering column's casing tube also has a steering column lock fastened to it. An ignition switch can be a functional module that is part of a steering column module. The functional modules also have an electronic module assigned to them, which makes contact with the individual functional modules and which connects the functional modules to the vehicle electrical system. In addition, the power electronics of the functional modules can be arranged on the electronic board.

To make it easier to assemble such a steering column module, the individual functional modules make electrical contact with the electronic module through plug-and-socket connectors, one part of each of which is assigned to a functional module with which contact is supposed to be made, and the complementary part cooperating with the first part is assigned to the electronic module. In a previously known embodiment, such as for example that disclosed in EP 0 853 022 A1, the electronic module forms its own plane in the structure of the steering column module, and thus is integrated in the stratified structure of the functional module. In this previously known embodiment, the electronic module forms a lowest plane, which has several steering column switches arranged on it in a first functional module plane lying above it. The adjacent arrangement makes it easy for there to be direct contact between the switches and the electronic module. Another plane above the plane of the steering column switches has a contact coil cassette arranged in it. In order that this can also make contact through the electronic module, it has an elongated extension which reaches through the arrangement of steering column switches into the plane of the electronic module, so that it can be inserted into one part of a plug-and-socket connector of the electronic module.

Although this previously known steering column module can have several functional modules arranged in different planes make electrical contact with the electronic module, it requires that the functional modules not directly bordering the electronic module reach through the others. To accomplish this, the functional modules—both those which are supposed to make contact with the electronic module and those through which the contact must pass—have to be specially designed. This absolute need for steering column modules to be coordinated on top of one another makes it difficult to make steering column modules whose functional modules can be combined according to a modular principle to form a steering column module which meets the appropriate specifications. The fact that the functional modules that are not adjacent to the electronic module reach through other functional modules especially limits the space in this functional module plane that is available for the other functional modules. If it is desired to provide a connection to the electronic module for functional modules which must reach through two or more functional module planes, this is only possible with excessive effort.

SUMMARY OF THE INVENTION

Starting from the prior art which has been discussed, the invention is therefore based on the task of further developing a motor vehicle steering column module of the type mentioned at the beginning so as to avoid the disadvantages shown for the prior art.

This task is solved according to the invention by the fact that plug-and-socket connector parts of the functional modules, which are provided for the electronic module to make contact, are arranged so that their longitudinal extension is radial or tangential to the steering column, and the electronic module is arranged on the functional modules so that the plug-and-socket connector parts assigned to it are on the outside and so that the electronic module engages with the plug-and-socket connector parts.

In the steering column module according to the invention, in contrast to the previously known prior art, the electronic module is not part of the stratified structure, but rather extends transverse to the stratified arrangement of functional module planes. Consequently, depending on the design of the electronic module, it is possible for a virtually unlimited number of functional modules arranged in different planes relative to the longitudinal axis of the steering column to make contact, without the functional modules having to reach through one another to do so. Each functional module plane has, for the functional modules which are to make contact, at least one plug-and-socket connector part arranged so that its longitudinal extension is radial or tangential to the longitudinal axis of the steering column. The plug-and-socket connectors are on the outside of the functional modules which are to make contact, so that pushing on or putting on the electronic module simultaneously makes contact with all functional modules. The peripheral arrangement of the electronic module is also especially advantageous with regard to the interchangeability of the electronic module or for repair purposes, since the structure of functional modules on top of one other does not have to be taken apart.

It is expedient for the electronic module to be held in a housing, which can have means of attachment on it to fasten the housing on the functional modules. For example, such attachment can be implemented by the use of snap-on devices which act like clips. This means that the electronic module or its housing can also be used to implement the fixing of the functional modules in different planes to one another. The electronic module does not need any additional space in the axial direction relative to the steering column's longitudinal axis. As it is, this space is very limited, since steering column modules are having an increasing number of functional modules integrated into them. The electronic module lying against the functional modules on the outside can be arranged, for example, with its housing on the side of a steering column module facing the floor of a motor vehicle.

An expedient embodiment of such a steering column module also has a lock body of a steering column lock integrated into it, which is fastened to the steering column's casing tube. Although this lock body does not itself represent a functional module, in this embodiment it acts as a carrier for the functional modules which are arranged in layers on top of one another. This arrangement saves more free space in the axial direction, since the previously known prior art for attaching the functional modules uses separate carriers that are individually fastened to the casing tube.

Another embodiment provides that the electronic module has extensions which can fold out of the actual assembly plane, which is arranged parallel to the steering column, into the plane of the functional modules. Such extensions can, for example, grasp the top and bottom functional modules, so that it is also possible for them to make contact in the axial direction. In such a case the electronic module itself can be made, for example, in the form of a flexible, partially stiffened circuit board, so that connection of additional circuit board conductors is not necessary.

BRIEF DESCRIPTION OF THE DRAWINGS

Further advantages and embodiments of the invention are described with reference to the following Figures.

DETAILED DESCRIPTION OF THE PREFERRED EMBODIMENT(S)

Figure 1:
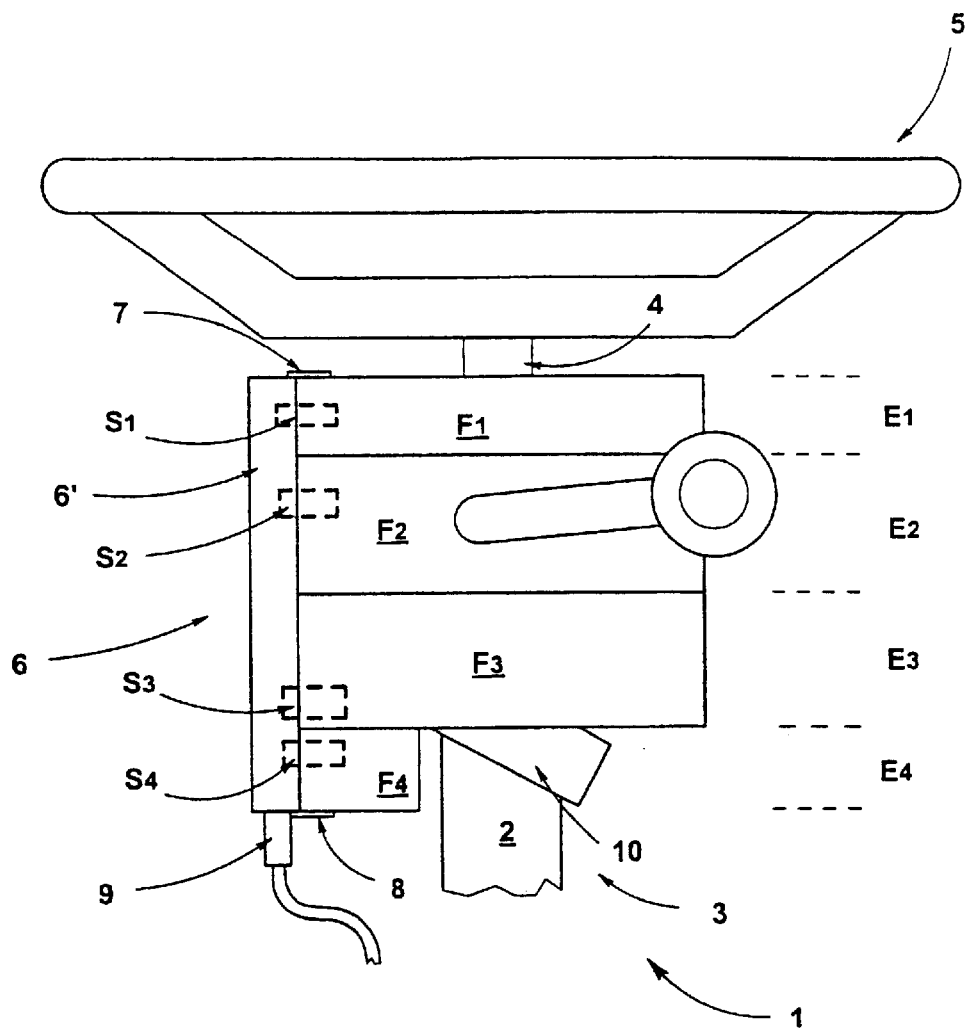
FIG. 1 illustrates a schematic side view of a steering column module mounted on the casing tube of a steering column.

A steering column module 1 is attached to the casing tube 2 of a steering column 3. The free end of steering shaft 4 has a steering wheel 5 arranged on it. Steering column module 1 consists of several functional modules $F_1$–$F_4$, which are arranged to lie above one another in layers, so to speak, in four parallel planes $E_1$–$E_4$. One functional module plane can have several individual functional modules arranged in it. The functional module planes $E_1$–$E_4$ run transverse to the longitudinal extension of steering column 3. Functional modules $F_1$–$F_4$ have an electronic module 6 which is arranged to border them on the outside and which is attached to the stack of functional modules by bracing feet 7, 8. Electronic module 6 consists of a housing 6' containing electronics (not shown), which provide contact between the individual functional modules $F_1$–$F_4$ and the vehicle electrical system and hold the power electronics of the individual functional modules $F_1$–$F_4$. Electronic module 6 has a connection 9 which can connect it with the motor vehicle electrical system.

The individual functional modules $F_1$–$F_4$ make electronic contact through the electronic module via plug-and-socket connectors $S_1$–$S_4$, which are schematically shown in FIG. 1 by dashed lines. Plug-and-socket connectors $S_1$–$S_4$ each consist of two parts, one of which is assigned to a functional module $F_1$–$F_4$, and the other, complementary one of which is assigned to the electronic module 6. Pushing electronic module 6 on from a radial or tangential direction to the longitudinal axis of steering column 3 makes contact with the individual functional modules $F_1$–$F_4$. The fact that the functional module stack is grasped by bracing feet 7, 8 provides additional axial fixing for the functional modules $F_1$–$F_4$ that are contained in the individual planes $E_1$–$E_4$.

In the sample embodiment shown, steering column module 1 is attached to casing tube 2 through the lock body 10 of a steering column lock. Functional unit 4 is an ignition switch, whose activation can also unlock the steering wheel.

Figure 2:
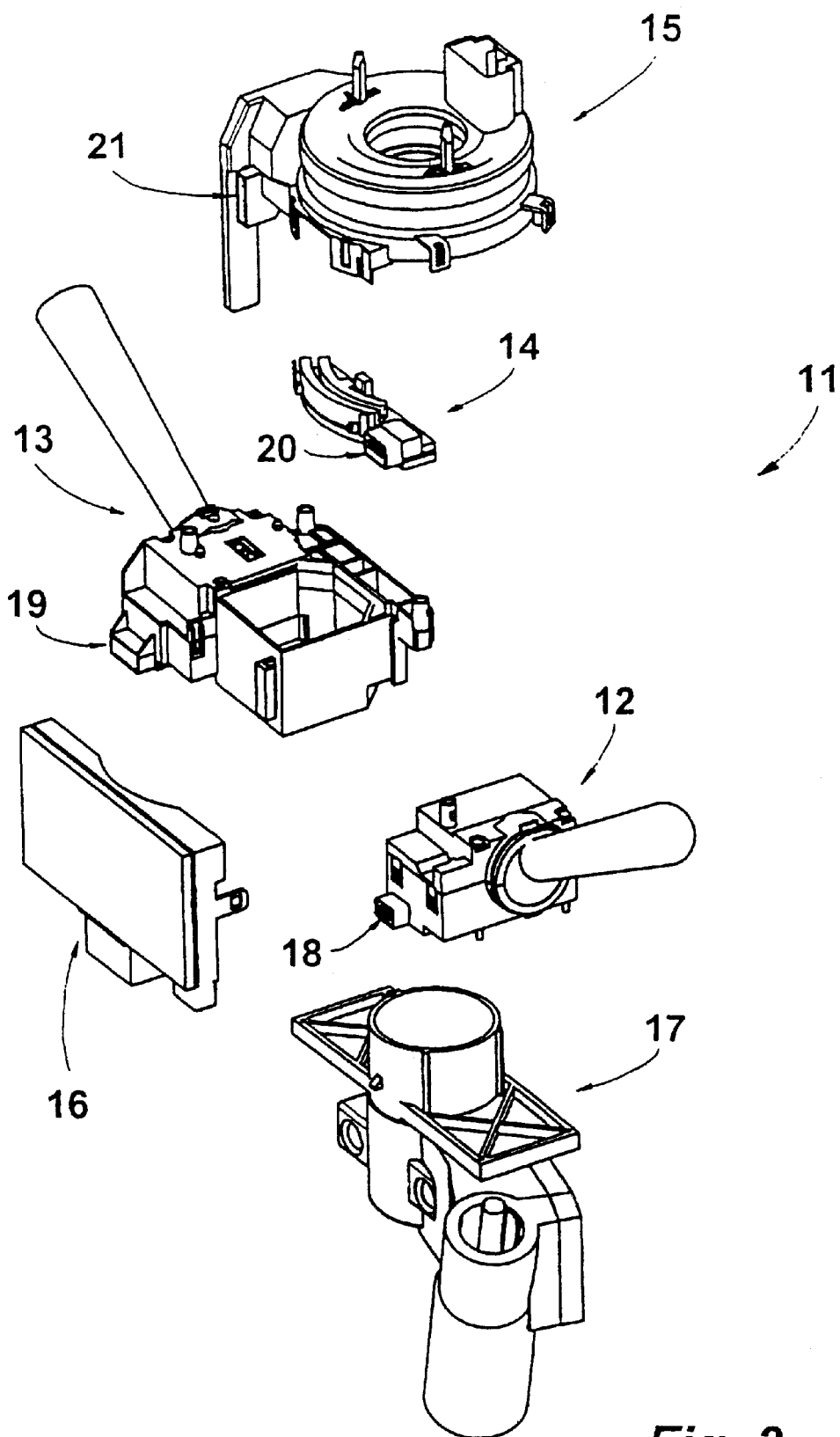
FIG. 2 illustrates an exploded view of a steering column module according to the invention.

FIG. 2 shows another steering column module 11, whose functional modules are two steering column switches 12, 13, a steering angle sensor device 14, and a contact coil cassette 15, which are arranged in three planes located above one another. Steering column switches 12, 13 define a functional module plane. Also belonging to steering column module 11 is an electronic module 16 as well as the lock body 17 of a steering column lock, which can be used to attach steering column module 11 to the steering column's casing tube. Each functional module 12–15 has a plug-and-socket connector part 18–21 which goes radially or tangentially out from the axis of the steering column, and after steering column module 11 is assembled these plug-and-socket connector parts make contact through electronic module 16. Electronic module 16 carries, at the corresponding place, plug-and-socket connector parts that are complementary to plug-and-socket connector parts 18–21.

Figure 3:
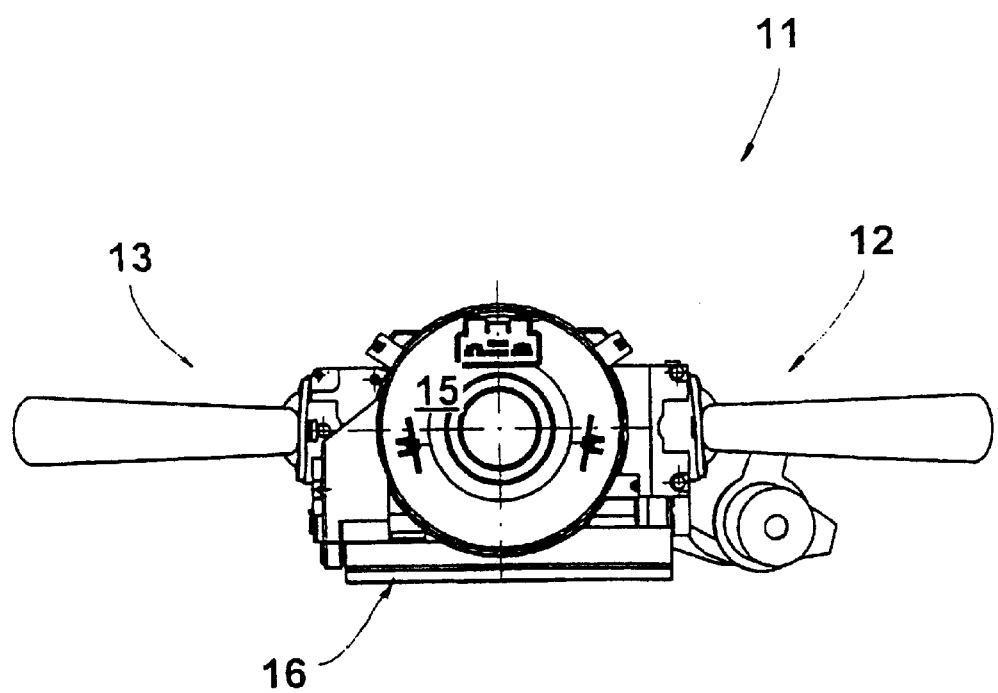
FIG. 3 illustrates a top view of the assembled steering column module shown in FIG. 2.

The space-saving manner in which electronic module 16 is built on to the rest of the parts can be seen from the top view of steering column module 11 in FIG. 3, which shows steering column module 11 after assembly when viewed from the direction of the steering wheel.

The description of the invention makes clear the advantages of the claimed steering column module, especially with regard to the possibilities of a modular structure, without having to take into consideration contact organs that reach through. It is also possible for the electronic module to be made available according to the desired number of functional modules and their design. It is possible to design the housing of the electronic module so that it stays the same, while its inside—the electronics and the plug-and-socket connector parts—are adapted to the respective relationships which are desired. The assembly and disassembly of such a steering column module is simplified in comparison with the assembly of previously known functional modules to form a steering column module.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A steering column module comprising:
   at least two functional modules arranged adjacent to one another in respective parallel planes along an axial direction relative to the longitudinal axis of a steering column;
   at least two plug-and-socket connectors each associated with a respective one of the at least two functional modules, each of the at least two plug-and-socket connectors extending radially from the longitudinal axis of the steering column, each of the at least two plug-and-socket connectors having first and second parts, the first part of each of the at least two plug-and-socket connectors being connected to the respective one of the at least two functional modules, and the second part of each of the at least two plug-and-socket connectors extending radially out from the respective one of the at least two functional modules; and an electronic module connected to a vehicle electrical system, the electronic module extending transversely to the respective parallel planes of the at least two functional modules and arranged against the at least two functional modules such that the electronic module engages the second part of each of the least two plug-and-socket connectors to connect the at least two functional modules to the electronic module and the vehicle electrical system.

2. The steering column module of claim 1 wherein:

the electronic module has a housing having bracing feet which fasten the electronic module to one or more of the at least two functional modules.

3. The steering column module of claim 2 wherein:

the bracing feet carry a bracing bulge and which reach behind undercuts arranged on the one or more of the at least two functional modules.

4. The steering column module of claim 1 wherein:

the electronic module has fold-out extensions which lie in the axial direction relative to the longitudinal axis of the steering column against respective top and bottom sides of respective top and bottom functional modules of the at least two functional modules.

5. The steering column module of claim 1 wherein:

the electronic module has a connection plug-and-socket connector part which connects the electronic module to the vehicle electrical system, the connection plug-and-socket connector part is arranged such that its longitudinal extension runs in the axial direction relative to the longitudinal axis of the steering column and faces away from a steering wheel connected to the steering column.

6. The steering column module of claim 1 wherein:

the at least two functional modules are attached to the steering column through a lock body of a steering column lock fastened to a casing tube of the steering column.

7. A steering column module comprising:

functional modules arranged adjacent to one another in respective parallel planes along an axial direction relative to the longitudinal axis of a steering column;

plug-and-socket connectors each associated with a respective one of the functional modules, each of the plug-and-socket connectors extending radially from the longitudinal axis of the steering column, each of the plug-and-socket connectors having first and second parts, the first part of each of the plug-and-socket connectors being connected to the respective one of the functional modules, and the second part of each of the plug-and-socket connectors extending radially out from the respective one of the functional modules; and an electronic module extending transversely to the respective parallel planes of the functional modules and contacting the functional modules such that the electronic module engages the second part of each of the plug-and-socket connectors to connect the functional modules to the electronic module.

8. A steering column module comprising:

at least two functional modules arranged around at least a portion of a steering column and arranged adjacent to one another in respective parallel planes along an axial direction relative to the longitudinal axis of a steering column;

at least two plug-and-socket connectors each associated with a respective one of the at least two functional modules, each of the at least two plug-and-socket connectors extending radially from the longitudinal axis of the steering column, each of the at least two plug-and-socket connectors having first and second parts, the first part of each of the at least two plug-and-socket connectors being connected to the respective one of the at least two functional modules, and the second part of each of the at least two plug-and-socket connectors extending radially out from the respective one of the at least two functional modules; and an electronic module operable to be connected to a vehicle electrical system, the electronic module operable to engage each of the second parts of the at least two plug-and-socket connectors to electrically connect the at least two functional modules to-the vehicle electrical system via the electronic module.

* * * * *